United States Patent
Fujii

[11] 4,106,854
[45] Aug. 15, 1978

[54] PHOTOGRAPHIC LENS SYSTEM HAVING A LARGE APERTURE RATIO

[75] Inventor: Toru Fujii, Hino, Japan

[73] Assignee: Olympus Optical Co., Ltd., Japan

[21] Appl. No.: 784,795

[22] Filed: Apr. 5, 1977

[30] Foreign Application Priority Data

Apr. 6, 1976 [JP] Japan .................. 51-37850

[51] Int. Cl.² .................................. G02B 11/30
[52] U.S. Cl. ........................... 350/176; 350/218
[58] Field of Search ..................... 350/218, 176

[56] References Cited
U.S. PATENT DOCUMENTS

| 3,817,603 | 6/1974 | Takahashi | 350/218 |
| 4,045,127 | 8/1977 | Matsubara | 350/218 |

Primary Examiner—Conrad J. Clark
Attorney, Agent, or Firm—Cushman, Darby & Cushman

[57] ABSTRACT

A gauss type photographic lens system having a large aperture ratio which comprises five components of six lens elements and wherein symmetry of coma is improved and curvature of field, spherical aberration, etc., are favorably corrected by enlarging the airspace comprising a stop and increasing refractive indices of the lens elements arranged on both the sides of said stop.

6 Claims, 21 Drawing Figures

SPHERICAL ABERRATION
F1.8

SINE CONDITION
F1.8

ASTIGMATISM
22°

DISTORTION
22°

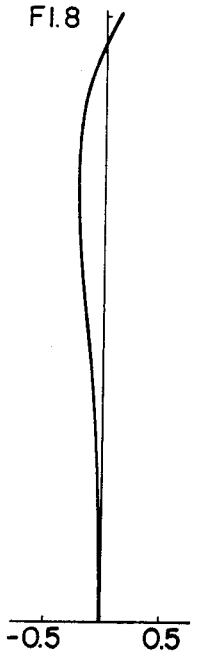 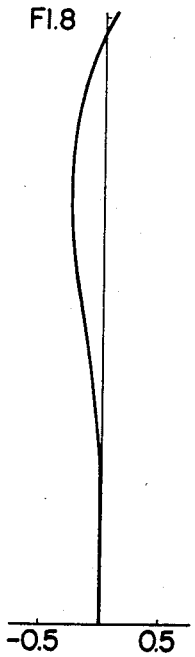 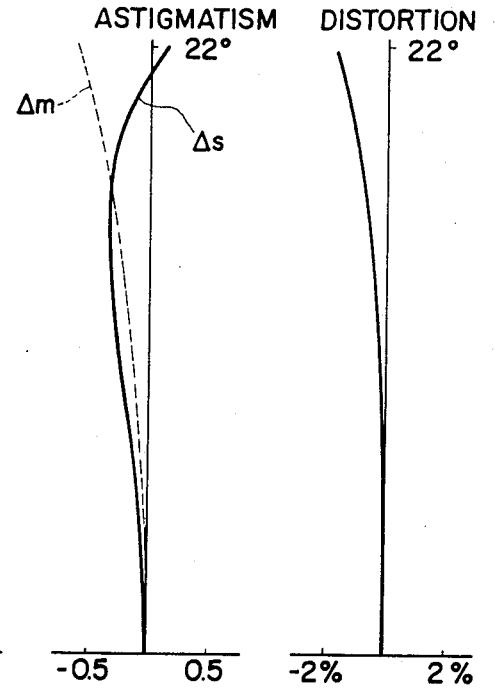 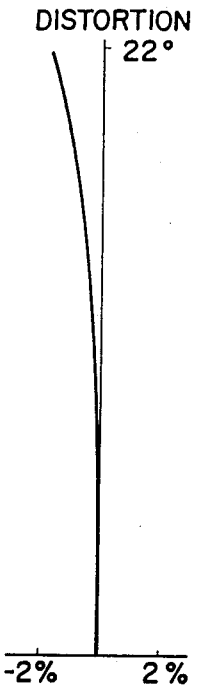
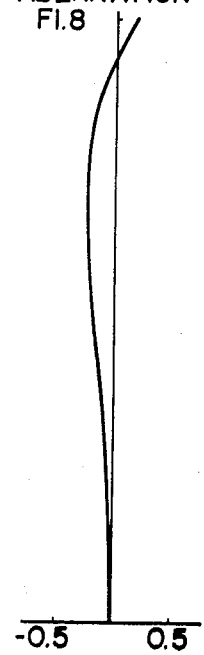 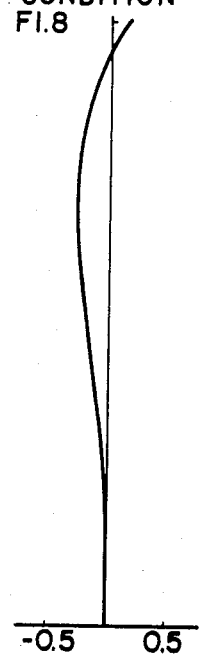 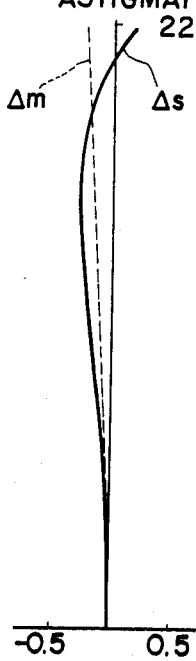 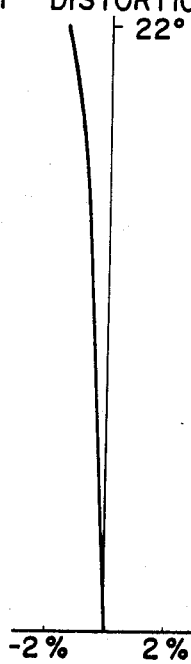

SPHERICAL
ABERRATION
F1.8

SINE
CONDITION
F1.8

ASTIGMATISM
22°
Δm   Δs

DISTORTION
22°

SPHERICAL
ABERRATION
F1.8

SINE
CONDITION
F1.8

ASTIGMATISM
22°
Δm   Δs

DISTORTION
22°

PHOTOGRAPHIC LENS SYSTEM HAVING A LARGE APERTURE RATIO

BACKGROUND OF THE INVENTION

1. Field of the Invention

The present invention relates to a Gauss type photographic lens system having a large aperture ratio on the order of F 1.8.

2. Description of the Prior Art

In conventional Gauss type lens system, it is considered advantageous for correcting flare due to coma to separate a cemented surface of a cemented lens component which is arranged on the object side of a stop. Though separation of such a cemented lens component is advantageous for correcting flare due to coma, it has a drawback that it aggravates asymmetry of coma produced by rays around the principal ray.

An effective means for eliminating this drawback is to widen the airspace between negative meniscus lens components having strong powers arranged on both sides of an aperture stop. However, such a means will unavoidably increase Petzval's sum, thereby aggravating curvature of field and producing spherical aberration.

SUMMARY OF THE INVENTION

A general object of the present invention is to provide a Gauss type photographic lens system wherein coma, curvature of field, etc., are favorably corrected by arranging negative meniscus lens components having strong powers on both sides of an aperture stop, widening the airspace formed between these lens components and parting high refractive indices to said lens components. The lens system according to the present invention has such a composition as shown in FIG. 1 and comprises five components of six lens elements, i.e., a first positive meniscus lens components having a convex surface on the object side, a second positive meniscus lens component having a convex surface on the object side, a third negative lens component having a convex surface on the object side, an airspace in which an aperture stop is arranged, a fourth negative meniscus lens component and a fifth positive lens component. Said lens system is characterized by the fact that it satisfies the following conditions:

(1) $0.22f \leq d6 \leq 0.27f$
(2) $1.74 \leq n3, n4$
(3) $\nu3, \nu4 < 30$
(4) $-2.5f \geq r8 \geq -70f$
(5) At least, either $\nu1$ or $\mu2$ is 40 and below
(6) $n1, n2, n5, n6 > 1.7$
(7) $0.25/f \leq |1/r4| - |1/r5| \leq 0.4/f$ Wherein the reference symbols represent as defined below:

$f$: focal length of the lens system as a whole
$r4$: radius of curvature on the image side surface of the second lens component
$r5$: radius of curvature on the object side surface of the third lens component
$r8$: radius of curvature on the cemented surface of the fourth lens component
$d6$: airspace between the third and fourth lens components
$n1$ through $n6$: refractive indices of the respective lens elements taken from the object side to the image side
$\nu1$ through $\nu6$: Abbe's numbers of the respective lens elements Now, the significance of the above-mentioned conditions will be described consecutively below:

The condition (1) is required for correcting asymmetry of coma produced by the rays around the principal ray described at the beginning of this specification. If the airspace $d6$ between the third and fourth lens components is smaller than $0.22f$, asymmetry of coma is aggravated and lens performance is degraded when the stop is so set as to select a small aperture size. If $d6$ exceeds $0.27f$, in contrast, the asymmetry of coma is corrected but Petzval's sum becomes too large to be corrected by the first, second and other positive lens components and, in addition, it is difficult to correct spherical aberration by the third lens component and the object side biconcave element of the fourth component.

The condition (2) is necessary to correct spherical aberration which is produced when $d6$ is selected within the range defined by the condition (1). When the refractive indices $n3$ and $n4$ of the third lens component and the object side element of the fourth lens component are smaller than 1.74, spherical aberration will be remarkably aggravated.

In conventional variant Gauss type lens systems, either one of refractive indices $n3$ and $n4$ of the aforesaid lens components is selected at low levels for correcting longitudinal chromatic aberration and lateral chromatic aberration. According to the present invention, both $n3$ and $n4$ are selected at high levels for correcting spherical aberration and, therefore, the condition (3) is required for correcting longitudinal chromatic aberration and lateral chromatic aberration even when $n3$ and $n4$ have such large values.

If $\nu3$ and $\nu4$ exceed 30 in the condition (3), longitudinal chromatic aberration and lateral chromatic aberration will be overcorrected by selecting $n3$ and $n4$ in the range defined by the condition (2) and cannot be corrected by other means.

The condition (4) is effective to correct astigmatism which is produced by setting the condition (2) and spherical aberration produced by setting the condition (1). If radius of curvature $r8$ on the cemented surface of the fourth lens component exceeds $-2.5f$ in the condition (4), spherical aberration will be undercorrected. When $r8$ is smaller than $-70f$, in contrast, astigmatism will be aggravated.

The condition (5) is required, in combination with the condition (3), for correcting chromatic aberration which is aggravated by selecting $n3$ and $n4$ in the range defined by the condition (2). That is to say, this condition is effective to balance longitudinal chromatic aberration by preliminarily undercorrecting it with the first or second lens component for preventing overcorrection in the later stages. Speaking concretely, longitudinal chromatic aberration will be overcorrected if either one of Abbe's numbers $\nu1$ and $\nu2$ is not small. In the conventional lens systems of this type, it is general to adopt a material having large Abbe's number for the first and second lens components to control production of chromatic aberration to a low level. In the lens system according to the present invention, incontrast, it is impossible to favorably correct chromatic aberration by such a concept.

The condition (6) is adopted for minimizing Petzval's sum which is increased by selecting $d6$ within the range defined by the condition (1). If the condition (6) is not satisfied, Petzval's sum will unavoidably be increased and curvature of field will be aggravated.

The condition (7) is necessary for correcting flare due to coma. When $|1/r4| - |1/r5|$ is larger or smaller than the upper or lower limit of the condition (7), asymmetry of coma will be aggravated for rays having relatively large diameter.

BRIEF DESCRIPTION OF THE DRAWINGS

FIG. 3A through FIG. 3D show graphs illustrating the aberration characteristics of the Embodiment 2;

FIG. 4A through FIG. 4D illustrate curves showing the aberration characteristics of the Embodiment 3;

DESCRIPTION OF THE PREFERRED EMBODIMENTS

Figure 1:
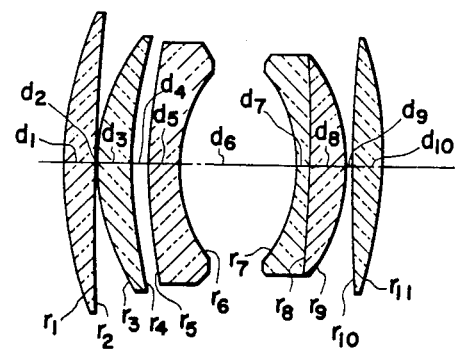
FIG. 1 shows a sectional view illustrating the composition of the lens system according to the present invention.
Figure 2A:
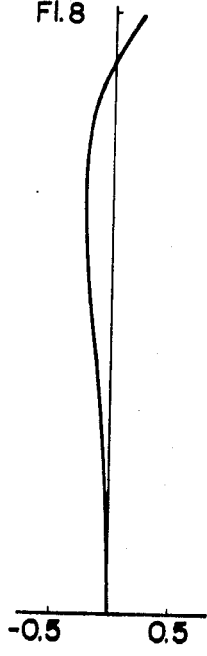
FIG. 2A through FIG. 2D show graphs illustrating the aberration characteristics of the Embodiment 1.
Figure 2B:
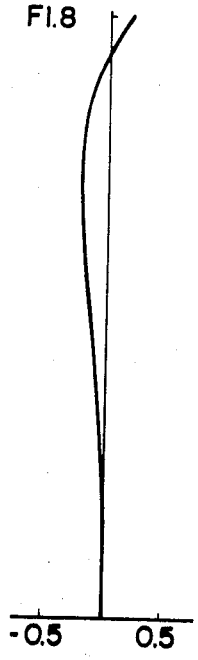
Figure 2C:
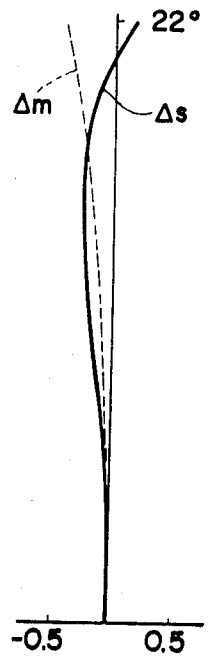
Figure 2D:
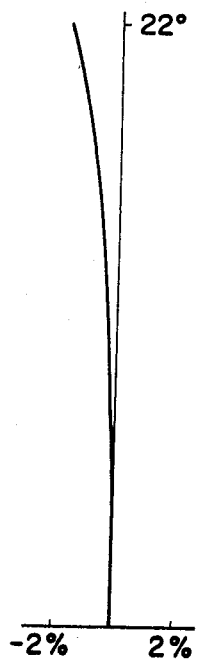
Figure 5A:
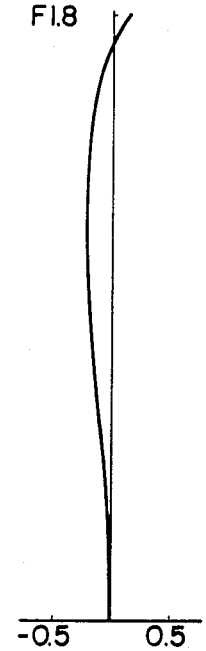
FIG. 5A through FIG. 5D illustrate curves showing the aberration characteristics of the Embodiment 4.
Figure 5B:
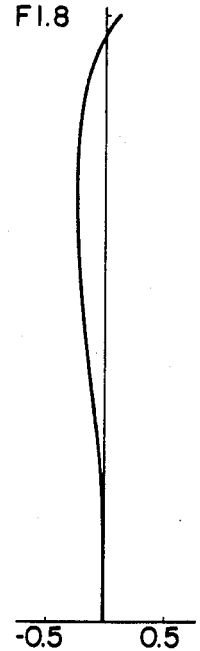
Figure 5C:
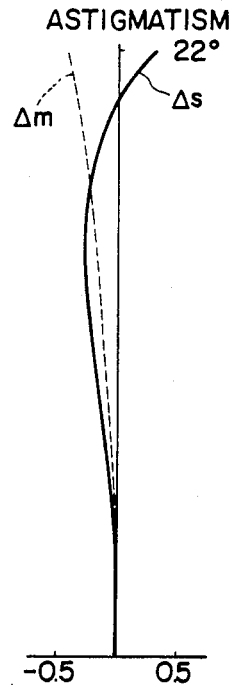
Figure 5D:
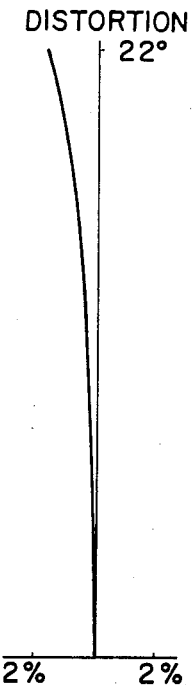
Figure 6A:
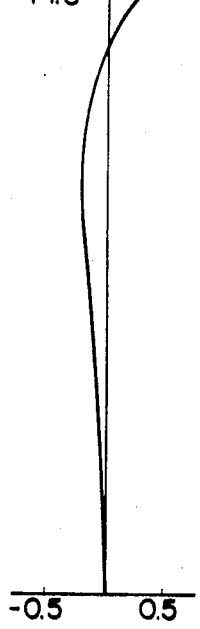
FIG. 6A through FIG. 6D illustrate curves showing the abeeration characteristics of the Embodiment 5.
Figure 6B:
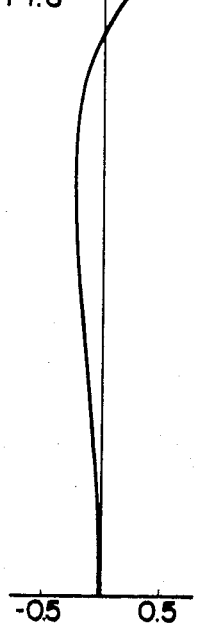
Figure 6C:
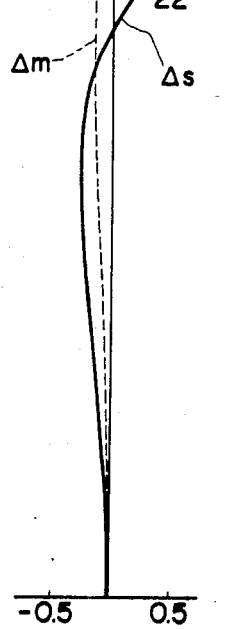
Figure 6D:
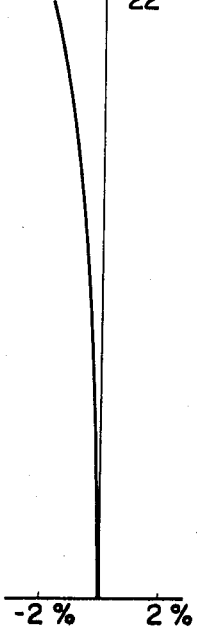

Now, some preferred embodiments of the present invention will be detailedly described below:

Embodiment 1:
$f = 100$
$r1 = 85.439$
  $d1 = 7.203$   $n1 = 1.72342$   $\nu1 = 37.95$
$r2 = 489.676$
  $d2 = 0.231$
$r3 = 42.989$
  $d3 = 7.704$   $n2 = 1.72$   $\nu2 = 42.08$
$r4 = 98.883$
  $d4 = 3.659$
$r5 = 134.033$
  $d5 = 6.163$   $n3 = 1.80518$   $\nu3 = 25.43$
$r6 = 30.952$
  $d6 = 26.136$
$r7 = -28.505$
  $d7 = 2.176$   $n4 = 1.7618$   $\nu4 = 27.11$
$r8 = -469.068$
  $d8 = 9.033$   $n5 = 1.8061$   $\nu5 = 40.92$
$r9 = -37.307$
  $d9 = 0.25$
$r10 = 463.613$
  $d10 = 6.356$   $n6 = 1.8061$   $\nu6 = 40.92$
$r11 = -80.874$ Embodiment 2:
$f = 100$
$r1 = 77.210$
  $d1 = 7.759$   $n1 = 1.72$   $\nu1 = 43.70$
$r2 = 443.523$
  $d2 = 0.247$
$r3 = 42.952$
  $d3 = 10.676$   $n2 = 1.72342$   $\nu2 = 37.95$
$r4 = 87.621$
  $d4 = 2.956$
$r5 = 133.974$
  $d5 = 3.050$   $n3 = 1.80518$   $\nu3 = 25.43$
$r6 = 30.744$
  $d6 = 23.807$
$r7 = -29.197$
  $d7 = 2.355$   $n4 = 1.74$   $\nu4 = 28.29$
$r8 = -5414.711$
  $d8 = 9.17$   $n5 = 1.8061$   $\nu5 = 40.92$
$r9 = -38.508$
  $d9 = 0.382$
$r10 = 319.82$
  $d10 = 6.465$   $n6 = 1.72$   $\nu6 = 42.08$
$r11 = -80.42$ Embodiment 3:
$f = 100$
$r1 = 82.255$
  $d1 = 7.225$   $n1 = 1.72342$   $\nu1 = 37.95$
$r2 = 586.176$
  $d2 = 0.232$
$r3 = 43.606$
  $d3 = 8.345$   $n2 = 1.72342$   $\nu2 = 37.95$
$r4 = 95.959$
  $d4 = 1.082$
$r5 = 140.221$
  $d5 = 8.055$   $n3 = 1.80518$   $\nu3 = 25.43$
$r6 = 31.411$
  $d6 = 26.002$
$r7 = -29.017$
  $d7 = 2.395$   $n4 = 1.76182$   $\nu4 = 26.55$
$r8 = -292.91$
  $d8 = 9.311$   $n5 = 1.8061$   $\nu5 = 40.92$
$r9 = -37.54$
  $d9 = 0.232$
$r10 = 484.675$
  $d10 = 6.375$   $n6 = 1.8061$   $\nu6 = 40.92$
$r11 = -85.713$ Embodiment 4:
$f = 100$
$r1 = 77.299$
  $d1 = 7.761$   $n1 = 1.72$   $\nu1 = 43.7$
$r2 = 443.966$
  $d2 = 0.251$
$r3 = 43.09$
  $d3 = 10.676$   $n2 = 1.72342$   $\nu2 = 37.95$
$r4 = 87.782$
  $d4 = 2.954$
$r5 = 132.995$
  $d5 = 3.05$   $n3 = 1.80518$   $\nu3 = 25.43$
$r6 = 30.811$
  $d6 = 23.823$
$r7 = -29.19$
  $d7 = 2.355$   $n4 = 1.74$   $\nu4 = 28.29$
$r8 = -6565.377$
  $d8 = 9.17$   $n5 = 1.8061$   $\nu5 = 40.92$
$r9 = -38.572$
  $d9 = 0.386$
$r10 = 317.844$
  $d10 = 6.467$   $n6 = 1.72$   $\nu6 = 42.08$
$r11 = -80.31$ Embodiment 5:
$f = 100$
$r1 = 84.156$
  $d1 = 7.241$   $n1 = 1.72342$   $\nu1 = 37.95$
$r2 = 572.897$
  $d2 = 0.251$
$r3 = 43.129$
  $d3 = 8.11$   $n2 = 1.72342$   $\nu2 = 37.95$
$r4 = 98.614$
  $d4 = 1.352$
$r5 = 141.349$
  $d5 = 8.11$   $n3 = 1.80518$   $\nu3 = 25.43$
$r6 = 31.086$
  $d6 = 26.201$
$r7 = -28.737$
  $d7 = 2.22$   $n4 = 1.7618$   $\nu4 = 27.11$
$r8 = -484.009$
  $d8 = 9.114$   $n5 = 1.8061$   $\nu5 = 40.92$
$r9 = -37.138$
  $d9 = 0.251$
$r10 = 516.526$
  $d10 = 6.372$   $n6 = 1.8061$   $\nu6 = 40.92$
$r11 = -83.711$ Wherein the reference symbols $r1$ through $r11$ represent radii of curvature on the surfaces of the respective lens elements, the reference symbols $d1$ through $d10$ designate thicknesses of the respective lens elements and airspaces therebetween, the reference symbols $n1$ through $n6$ denote refractive indices of the respective lens elements and the reference symbols $\nu1$ through $\nu6$ represent Abbe's numbers of the respective lens elements.

I claim:

1. A photographic lens system having a large aperture ratio comprising a first positive meniscus lens component having a convex surface on the object side, a second positive meniscus lens component having a convex surface on the object side, a third negative meniscus lens components having a convex surface on the object side, a fourth negative meniscus cemented doublet component having a convex surface on the image side and a fifth positive lens component, and said lens system satisfying the following conditions:

(1) $0.22f \leq d6 \leq 0.27f$
(2) $1.74 \leq n3, n4$
(3) $\nu3, \nu4 < 30$
(4) $-2.5f \geq r8 \geq -70f$
(5) At least, either $\nu1$ or $\nu2$ is 40 and below
(6) $n1, n2, n5, n6 > 1.7$
(7) $0.25/f \leq |1/r4| - |1/r5| \leq 0.4/f$ wherein the reference symbol $d6$ represents thickness of the airspace formed between the third and fourth lens components, the reference symbols $r4$, $r5$ and $r8$ designate radii of curvature on the image side surface of the second lens component, the object side surface of the third lens component and the cemented surface on the fourth lens component, the reference symbols $n1$ through $n6$ denote refractive indices of the respective lens elements, the reference symbols $\nu1$ through $\nu4$ represent Abbe's numbers of the first lens component, the second lens component, the third lens component and the object side element of the fourth lens component and the reference symbol $f$ designates focal length of the lens system as a whole.

2. A photographic lens system having a large aperture ratio according to claim 1 which has the following numerical data:

| | | | |
|---|---|---|---|
| f = 100 | | | |
| r1 = 85.439 | | | |
| d1 = 7.203 | n1 = 1.72342 | ν1 = 37.95 |
| r2 = 489.676 | | | |
| d2 = 0.231 | | | |
| r3 = 42.989 | | | |
| d3 = 7.704 | n2 = 1.72 | ν2 = 42.08 |
| r4 = 98.883 | | | |
| d4 = 3.659 | | | |
| r5 = 134.033 | | | |
| d5 = 6.163 | n3 = 1.80518 | ν3 = 25.43 |
| r6 = 30.952 | | | |
| d6 = 26.136 | | | |
| r7 = −28.505 | | | |
| d7 = 2.176 | n4 = 1.7618 | ν4 = 27.11 |
| r8 = −469.068 | | | |
| d8 = 9.033 | n5 = 1.8061 | ν5 = 40.92 |
| r9 = −37.307 | | | |
| d9 = 0.25 | | | |
| r10 = 463.613 | | | |
| d10 = 6.356 | n6 = 1.8061 | ν6 = 40.92 |
| r11 = −80.874 | | | | wherein the reference symbol $f$ represents focal length of the lens system as a whole, the reference symbols $r1$ through $r11$ designate radii of curvature on the surfaces of the respective lens elements, the reference symbols $d1$ through $d10$ denote thickness of the respective lens elements and the airspace therebetween, the reference symbols $n1$ through $n6$ represent refractive indices of the respective lens elements and the reference symbols $\nu1$ through $\nu6$ designate Abbe's numbers of the respective lens elements.

3. A photographic lens system having a large aperture ratio according to claim 1 which has the following numerical data:

| | | | |
|---|---|---|---|
| f = 100 | | | |
| r1 = 77.210 | | | |
| d1 = 7.759 | n1 = 1.72 | ν1 = 43.70 |
| r2 = 443.523 | | | |
| d2 = 0.247 | | | |
| r3 = 42.952 | | | |
| d3 = 10.676 | n2 = 1.72342 | ν2 = 37.95 |
| r4 = 87.621 | | | |
| d4 = 2.956 | | | |
| r5 = 133.974 | | | |
| d5 = 3.050 | n3 = 1.80518 | ν3 = 25.43 |
| r6 = 30.744 | | | |
| d6 = 23.807 | | | |
| r7 = −29.197 | | | |
| d7 = 2.355 | n4 = 1.74 | ν4 = 28.29 |
| r8 = −5415.711 | | | |
| d8 = 9.17 | n5 = 1.8061 | ν5 = 40.92 |
| r9 = −38.508 | | | |
| d9 = 0.382 | | | |
| r10 = 319.82 | | | |
| d10 = 6.465 | n6 = 1.72 | ν6 = 42.08 |
| r11 = −80.42 | | | | wherein the reference symbol $f$ represents focal length of the lens system as a whole, the reference symbols $r1$ through $r11$ designate radii of curvature on the surfaces of the respective lens elements, the reference symbols $d1$ through $d10$ denote thickness of the respective lens elements and the airspace therebetween, the reference symbols $n1$ through $n6$ represent refractive indices of the respective lens elements and the reference symbols $\nu1$ through $\nu6$ designate Abbe's numbers of the respective lens elements.

4. A photographic lens system having a large aperture ratio according to claim 1 which has the following numerical data:

| | | | |
|---|---|---|---|
| f = 100 | | | |
| r1 = 82.255 | | | |
| d1 = 7.225 | n1 = 1.72342 | ν1 = 37.95 |
| r2 = 586.176 | | | |
| d2 = 0.232 | | | |
| r3 = 43.606 | | | |
| d3 = 8.345 | n2 = 1.72342 | ν2 = 37.95 |
| r4 = 95.959 | | | |
| d4 = 1.082 | | | |
| r5 = 140.221 | | | |
| d5 = 8.055 | n3 = 1.80518 | ν3 = 25.43 |
| r6 = 31.411 | | | |
| d6 = 26.002 | | | |
| r7 = −29.017 | | | |
| d7 = 2.395 | n4 = 1.76182 | ν4 = 26.55 |
| r8 = −292.91 | | | |
| d8 = 9.311 | n5 = 1.8061 | ν5 = 40.92 |
| r9 = −37.54 | | | |
| d9 = 0.232 | | | |
| r10 = 484.675 | | | |
| d10 = 6.375 | n6 = 1.8061 | ν6 = 40.92 |
| r11 = −85.713 | | | | wherein the reference symbol $f$ represents focal length of the lens system as a whole, the reference symbols $r1$ through $r11$ designate radii of curvature on the surfaces of the respective lens elements, the reference symbols $d1$ through $d10$ denote thickness of the respective lens elements and the airspace therebetween, the reference symbols $n1$ through $n6$ represent refractive indices of the respective lens elements and the reference symbols $\nu1$ through $\nu6$ designate Abbe's numbers of the respective lens elements.

5. A photographic lens system having a large aperture ratio according to claim 1 which has the following numerical data:

|   |   |   |   |
|---|---|---|---|
| f = 100 | | | |
| r1 = 77.299 | | | |
| | d1 = 7.761 | n1 = 1.72 | ν1 = 43.7 |
| r2 = 443.966 | | | |
| | d2 = 0.251 | | |
| r3 = 43.09 | | | |
| | d3 = 10.676 | n2 = 1.72342 | ν2 = 37.95 |
| r4 = 87.782 | | | |
| | d4 = 2.954 | | |
| r5 = 132.995 | | | |
| | d5 = 3.05 | n3 = 1.80518 | ν3 = 25.43 |
| r6 = 30.811 | | | |
| | d6 = 23.823 | | |
| r7 = −29.19 | | | |
| | d7 = 2.355 | n4 = 1.74 | ν4 = 28.29 |
| r8 = −6565.377 | | | |
| | d8 = 9.17 | n5 = 1.8061 | ν5 = 40.92 |
| r9 = −38.572 | | | |
| | d9 = 0.386 | | |
| r10 = 317.844 | | | |
| | d10 = 6.467 | n6 = 1.712 | ν6 = 42.08 |
| r11 = −80.31 | | | | wherein the reference symbol $f$ represents focal length of the lens system as a whole, the reference symbols $r1$ through $r11$ designate radii of curvature on the surfaces of the respective lens elements, the reference symbols $d1$ through $d10$ denote thickness of the respective lens elements and the airspace therebetween, the reference symbols $n1$ through $n6$ represent refractive indices of the respective lens elements and the reference symbols $ν1$ through $ν6$ designate Abbe's numbers of the respective lens elements.

6. A photographic lens system having a large aperture ratio according to claim 1 which has the following numerical data:

|   |   |   |   |
|---|---|---|---|
| f = 100 | | | |
| r1 = 84.156 | | | |
| | d1 = 7.241 | n1 = 1.72342 | ν1 = 37.95 |
| r2 = 572.897 | | | |
| | d2 = 0.251 | | |
| r3 = 43.129 | | | |
| | d3 = 8.11 | n2 = 1.72342 | ν2 = 37.95 |
| r4 = 98.614 | | | |
| | d4 = 1.352 | | |
| r5 = 141.349 | | | |
| | d5 = 8.11 | n3 = 1.80518 | ν3 = 25.43 |
| r6 = 31.086 | | | |
| | d6 = 26.201 | | |
| r7 = −28.737 | | | |
| | d7 = 2.22 | n4 = 1.7618 | ν4 = 27.11 |
| r8 = −484.009 | | | |
| | d8 = 9.114 | n5 = 1.8061 | ν5 = 40.92 |
| r9 = −37.138 | | | |
| | d9 = 0.251 | | |
| r10 = 516.526 | | | |
| | d10 = 6.372 | n6 = 1.8061 | ν6 = 40.92 |
| r11 = −83.711 | | | | wherein the reference symbol $f$ represents focal length of the lens system as a whole, the reference symbols $r1$ through $r11$ designate radii of curvature on the surfaces of the respective lens elements, the reference symbols $d1$ through $d10$ denote thickness of the respective lens elements and the airspace therebetween, the reference symbols $n1$ through $n6$ represent refractive indices of the respective lens elements and the reference symbols $ν1$ through $ν6$ designate Abbe's numbers of the respective lens elements.

* * * * *